US011318827B1

(12) United States Patent
Maloney et al.

(10) Patent No.: US 11,318,827 B1
(45) Date of Patent: May 3, 2022

(54) BOTTOM PAN SEAL SYSTEM

(71) Applicant: Trim-Lok, Inc., Buena Park, CA (US)

(72) Inventors: Marc E. Maloney, Elkhart, IN (US);
Kelly M. Klein, Elkhart, IN (US);
Kraig Bontrager, Shipshewana, IN (US)

(73) Assignee: TRIM-LOK, INC., Buena Park, CA (US)

( * ) Notice: Subject to any disclaimer, the term of this patent is extended or adjusted under 35 U.S.C. 154(b) by 0 days.

(21) Appl. No.: 17/377,222

(22) Filed: Jul. 15, 2021

(51) Int. Cl.
*B60R 13/06* (2006.01)
*B60J 10/21* (2016.01)
*B60J 10/36* (2016.01)
*B60P 3/34* (2006.01)

(52) U.S. Cl.
CPC .............. *B60J 10/21* (2016.02); *B60J 10/36* (2016.02); *B60P 3/341* (2013.01); *B60R 13/06* (2013.01)

(58) Field of Classification Search
CPC ... B60J 10/00; B60J 10/20; B60J 10/21; B60J 10/22; B60J 10/36; B60P 3/341; F16J 15/06; F16J 15/061
See application file for complete search history.

(56) References Cited

U.S. PATENT DOCUMENTS

| 2,744,781 | A | 5/1956 | Black |
|---|---|---|---|
| 3,242,531 | A | 3/1966 | Nohl |
| 3,242,537 | A | 3/1966 | Monti |
| 3,400,964 | A | 9/1968 | Baermann |
| 3,411,243 | A | 11/1968 | Baermann |
| 3,719,386 | A | 3/1973 | Lambert |
| 3,722,640 | A | 3/1973 | Taylor |
| 4,277,919 | A | 7/1981 | Artweger et al. |
| 4,361,348 | A | 11/1982 | Rapp et al. |
| 4,395,939 | A | 8/1983 | Hough et al. |
| 4,448,430 | A | 5/1984 | Bright |
| 4,549,761 | A | 10/1985 | Lee et al. |
| 4,695,499 | A | 9/1987 | Whitener |
| 4,916,864 | A | 4/1990 | Thompson |
| 4,955,661 | A | 9/1990 | Mattice |
| 5,085,006 | A | 2/1992 | Hayashi et al. |
| 5,193,310 | A | 3/1993 | Kiel |
| 5,237,782 | A | 8/1993 | Cooper |
| 5,408,784 | A | 4/1995 | Wruck et al. |
| 5,616,403 | A | 4/1997 | Eckberg et al. |

(Continued)

FOREIGN PATENT DOCUMENTS

| DE | 1055976 B | 4/1959 |
|---|---|---|
| DE | 9300312 U1 | 3/1993 |

(Continued)

*Primary Examiner* — Gilbert Y Lee
(74) *Attorney, Agent, or Firm* — Cislo & Thomas, LLP

(57) ABSTRACT

A bottom pan seal system for sealing a space between a floor of a slide-out room and a floor of a main cabin of a recreational vehicle, the bottom pan seal system having a bottom pan seal having a first leg having an outboard end and an inboard end. A second leg extends perpendicularly from the first leg. A wiper seal extends perpendicularly from the first leg opposite the second leg adjacent the outboard end. A flap seal extending perpendicularly from the second leg. A wear bar can be attached to three inboard end. The inboard end can have a wiper seal extending perpendicularly from the first leg and parallel to the wiper seal adjacent to the outboard end.

20 Claims, 13 Drawing Sheets

(56) References Cited

U.S. PATENT DOCUMENTS

| | | | |
|---|---|---|---|
| 5,785,373 | A | 7/1998 | Futrell et al. |
| 5,788,306 | A | 8/1998 | DiBiagio et al. |
| 5,791,715 | A | 8/1998 | Nebel |
| 5,894,698 | A | 4/1999 | Dewald, Jr. et al. |
| 6,007,142 | A | 12/1999 | Gehman et al. |
| 6,048,016 | A | 4/2000 | Futrell et al. |
| 6,094,870 | A | 8/2000 | Stacy |
| 6,108,983 | A | 8/2000 | Dewald, Jr. et al. |
| 6,152,516 | A | 11/2000 | Williams |
| 6,176,045 | B1 | 1/2001 | McManus et al. |
| 6,203,734 | B1 | 3/2001 | Schoonover et al. |
| 6,224,126 | B1 | 5/2001 | Martin et al. |
| 6,385,927 | B2 | 5/2002 | Schiedegger et al. |
| 6,401,398 | B1 | 6/2002 | Panayides et al. |
| 6,428,073 | B1 | 8/2002 | Blodgett, Jr. |
| 6,527,278 | B1 | 3/2003 | Norris |
| 6,572,170 | B2 | 6/2003 | McManus et al. |
| 6,598,354 | B2 | 7/2003 | McManus et al. |
| 6,619,726 | B2 | 9/2003 | Jones |
| 6,735,909 | B1 | 5/2004 | Gardner |
| 6,739,094 | B1 | 5/2004 | Berry et al. |
| 6,840,568 | B2 | 1/2005 | Carrillo et al. |
| 6,942,225 | B2 | 9/2005 | Gentemann et al. |
| 6,966,590 | B1 | 11/2005 | Ksiezopolki et al. |
| 7,380,854 | B1 | 6/2008 | Hanser et al. |
| 7,540,116 | B1 | 6/2009 | Martinson |
| 7,614,676 | B2 | 11/2009 | Ksiezopolski et al. |
| 7,614,677 | B2 | 11/2009 | Ksiezopolski et al. |
| 7,651,144 | B2 | 1/2010 | Clark et al. |
| 7,743,814 | B2 | 6/2010 | Woodward et al. |
| D648,657 | S | 11/2011 | Schoonover et al. |
| D651,146 | S | 12/2011 | Schoonover et al. |
| 8,192,827 | B2 | 6/2012 | Schoonover et al. |
| D664,669 | S | 7/2012 | Schoonover et al. |
| D664,670 | S | 7/2012 | Schoonover et al. |
| 8,240,744 | B2 | 8/2012 | Schwindaman et al. |
| D669,601 | S | 10/2012 | Schoonover et al. |
| D669,820 | S | 10/2012 | Schoonover et al. |
| 8,366,168 | B1 | 2/2013 | Ksiezopolski et al. |
| 8,382,124 | B2 | 2/2013 | Ksiezopolski et al. |
| 8,408,625 | B1 | 4/2013 | Ksiezopolski et al. |
| D697,640 | S | 1/2014 | Ksiezopolski |
| 8,701,351 | B2 | 4/2014 | Siegel |
| 8,875,443 | B2 | 11/2014 | Siegel |
| 8,910,422 | B2 | 12/2014 | Siegel |
| 8,985,662 | B2 | 3/2015 | Siegel |
| 9,033,390 | B1 | 5/2015 | Ksiezopolski |
| 9,038,322 | B2 | 5/2015 | Ksiezopolski |
| 9,045,027 | B2 | 6/2015 | Young et al. |
| 9,068,355 | B1 | 6/2015 | Ksiezopolski |
| 9,625,037 | B2 | 4/2017 | Young et al. |
| 10,501,026 | B2 * | 12/2019 | Ksiezopolski .......... B60R 13/06 |
| 2002/0078634 | A1 | 6/2002 | McManus et al. |
| 2002/0089213 | A1 | 7/2002 | Gehman et al. |
| 2006/0091687 | A1 | 5/2006 | Schoffner et al. |
| 2006/0117673 | A1 | 6/2006 | McManus |
| 2008/0116707 | A1 | 5/2008 | Boaz et al. |
| 2008/0265618 | A1 | 10/2008 | Cadena et al. |
| 2008/0282617 | A1 | 11/2008 | Zimmer et al. |
| 2009/0045649 | A1 | 2/2009 | Eungard et al. |
| 2012/0032406 | A1 | 2/2012 | Ksiezopolski et al. |
| 2013/0048550 | A1 | 2/2013 | Miles et al. |
| 2013/0086865 | A1 | 4/2013 | Schoonover et al. |
| 2014/0265051 | A1 | 9/2014 | Schoonover et al. |
| 2015/0158438 | A1 | 6/2015 | Ksiezopolski |
| 2016/0003358 | A1 | 1/2016 | Young |
| 2016/0159294 | A1* | 6/2016 | Ksiezopolski .......... B60R 13/06 277/637 |
| 2017/0102072 | A1* | 4/2017 | Ksiezopolski ......... F16J 15/027 |

FOREIGN PATENT DOCUMENTS

| | | |
|---|---|---|
| DE | 19912176 A1 | 9/2000 |
| GB | 2001589 A | 2/1979 |
| WO | 9933683 A1 | 7/1999 |
| WO | 0230705 A1 | 4/2002 |

\* cited by examiner

US 11,318,827 B1

BOTTOM PAN SEAL SYSTEM

TECHNICAL FIELD

This invention relates to seals for recreational vehicles.

BACKGROUND

Recreational vehicles (RV) are very popular for vacationing and traveling, providing the amenities of a home in a mobile package. The major downside of the RV is the size and number of rooms. To account for the small size and number of rooms, some RVs offer slide-out rooms. A slide-out room is a room or compartment that is housed in the main living compartment of the RV, but can slide out perpendicularly from the main living compartment so as to create an additional room adjacent to the main living compartment. When ready for departure, the slide-out room can slide back into the main compartment again.

A main problem with slide-out rooms is that debris and water can enter into the RV through the gaps created in between the walls of the slide-out room and the wall of the RV defining the opening for the slide-out room. The floor of the RV can be particularly problematic because of the debris that can get kicked up into the floor area by the tires when in motion. When parked with the slide-out room extended, light can also enter into the main cabin through openings in between the floors. Therefore, there is a need for an improved seal to create a tight seal between the floor of the slide-out rooms and the floor of the RV.

SUMMARY

The invention of the present application is directed towards a bottom pan seal system for use on a recreational vehicle (RV) underneath a floor of a slide-out room. The bottom pan seal system can be a one-piece system comprising a bottom pan seal providing sealing and high abrasion resistance of a slide-out room while either in the open or closed positions, as well as while moving between the two positions. In some embodiments, the bottom pan seal system can be a two-piece system comprising a bottom pan seal and wear bar that further provides a leveling function. The bottom pan seal includes a flap seal that functions as a splash guard on the underside of the slide-out room to protect against road spray and prevent light from entering into the RV from the underside, and one or more wiper seals that seals the bottom of the slide-out room while in both the in and out positions. The flap seal and wiper seals can be mounted on one or more legs of the bottom pan seal.

In some embodiments, the bottom pan seal system includes a wear bar that provides support for the room while traveling between the two positions. The wear bar connects to the bottom pan seal via the first leg that can be inserted into a slot defined by the wear bar. The first leg comprises a high durometer material that lies horizontally across the bottom of the opening that is designed at a depth to accept variations of the slot length. The first leg can include ribs of a lower durometer material to provide a seal with the wear bar where the first leg is inserted into the slot of the wear bar.

The wear bar has a slot that accepts the first leg with the low durometer ribs and has a slot having a depth that can accommodate the first leg. The depth of the slot can be adjusted to accommodate different lengths of first legs. The wear bar has a specific design to allow for support against two offset substrates (i.e. floor of slide-out room and floor of main cabin) while allowing for securement. The design is unique as it is the only part that accomplishes all features with only two parts while being able to be field serviceable without removing the slide-out room from the main cabin.

DETAILED DESCRIPTION OF THE INVENTION

The detailed description set forth below in connection with the appended drawings is intended as a description of presently-preferred embodiments of the invention and is not intended to represent the only forms in which the present invention may be constructed or utilized. The description sets forth the functions and the sequence of steps for constructing and operating the invention in connection with the illustrated embodiments. It is to be understood, however, that the same or equivalent functions and sequences may be accomplished by different embodiments that are also intended to be encompassed within the spirit and scope of the invention.

Figure 1A:
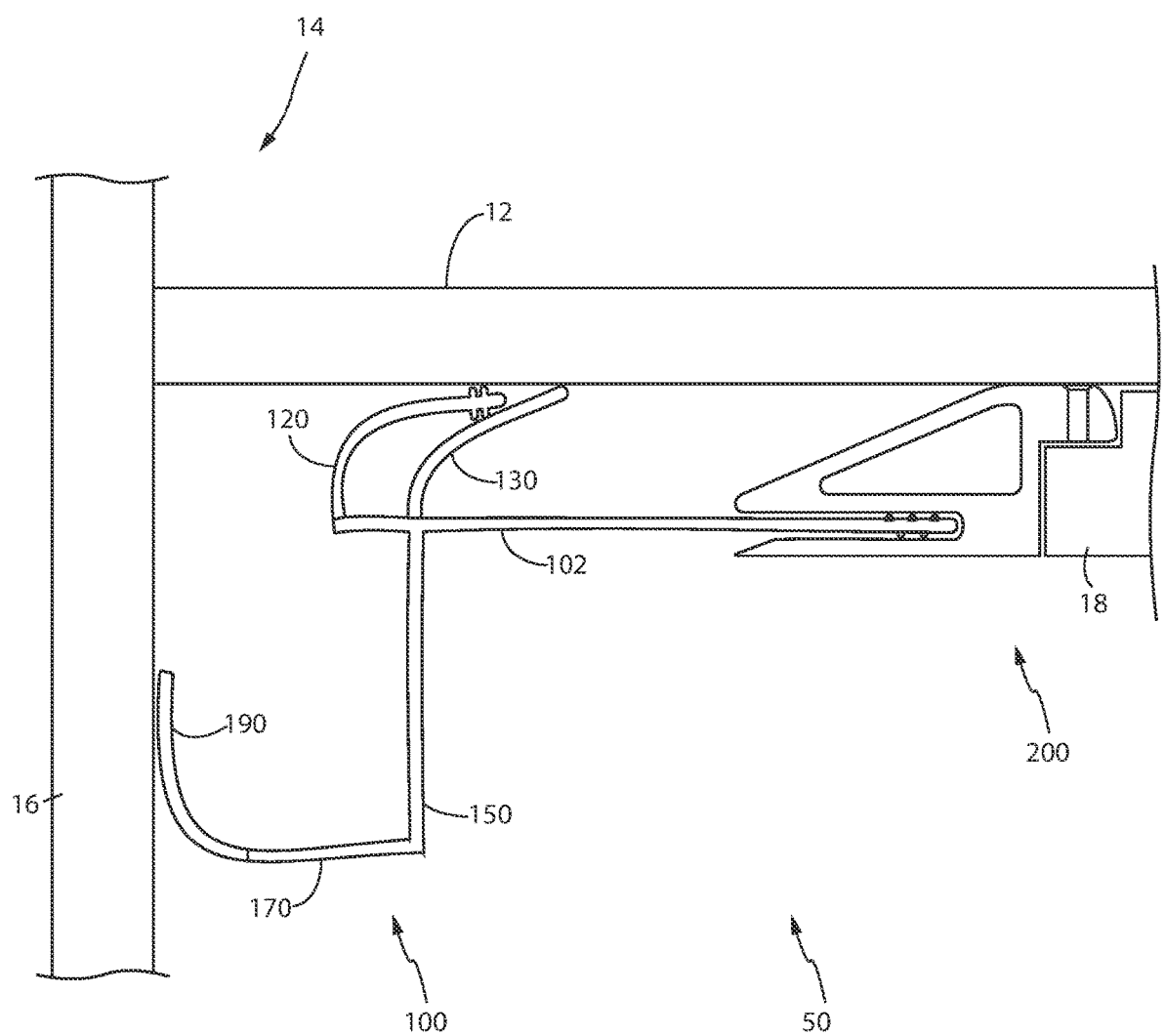
FIG. 1A shows a side elevation view of an embodiment of the present invention installed in an RV, with portions of the slide-out room side wall and floor shown in the closed position.
Figure 1B:
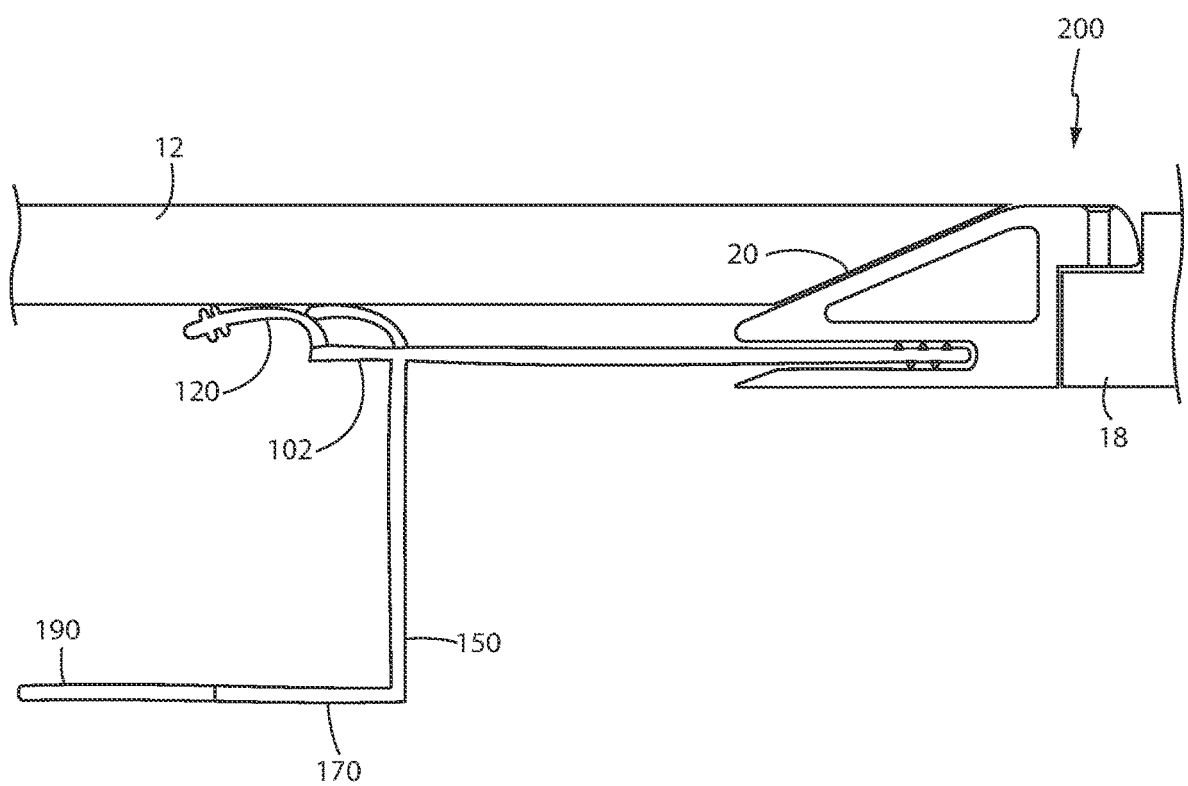
FIG. 1B shows a side elevation view of the embodiment shown in FIG. 1A installed in an RV, with portions of the slide-out room floor shown in the open position.
Figure 2:
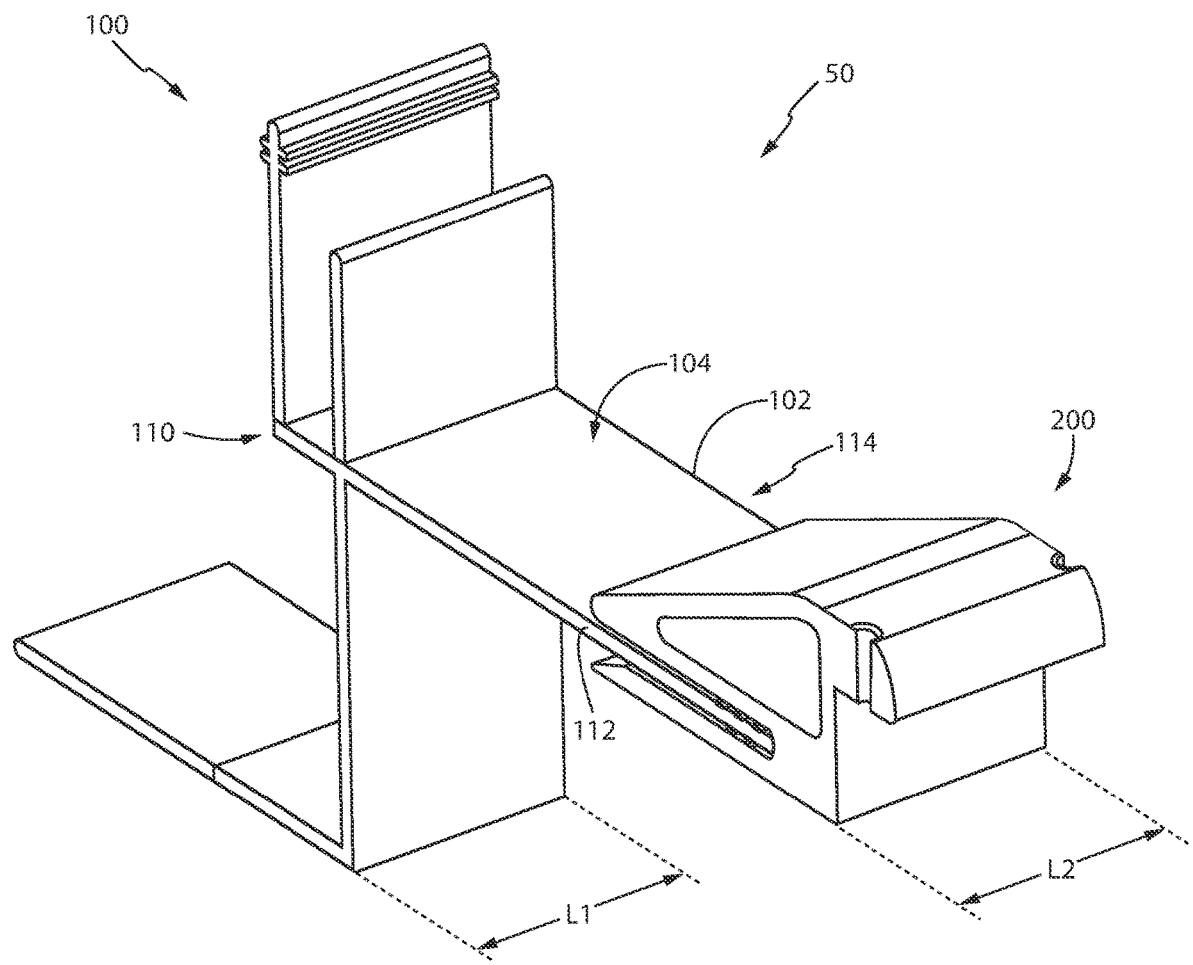
FIG. 2 shows a perspective view of an embodiment of the invention shown in FIG. 1A.
Figure 3:
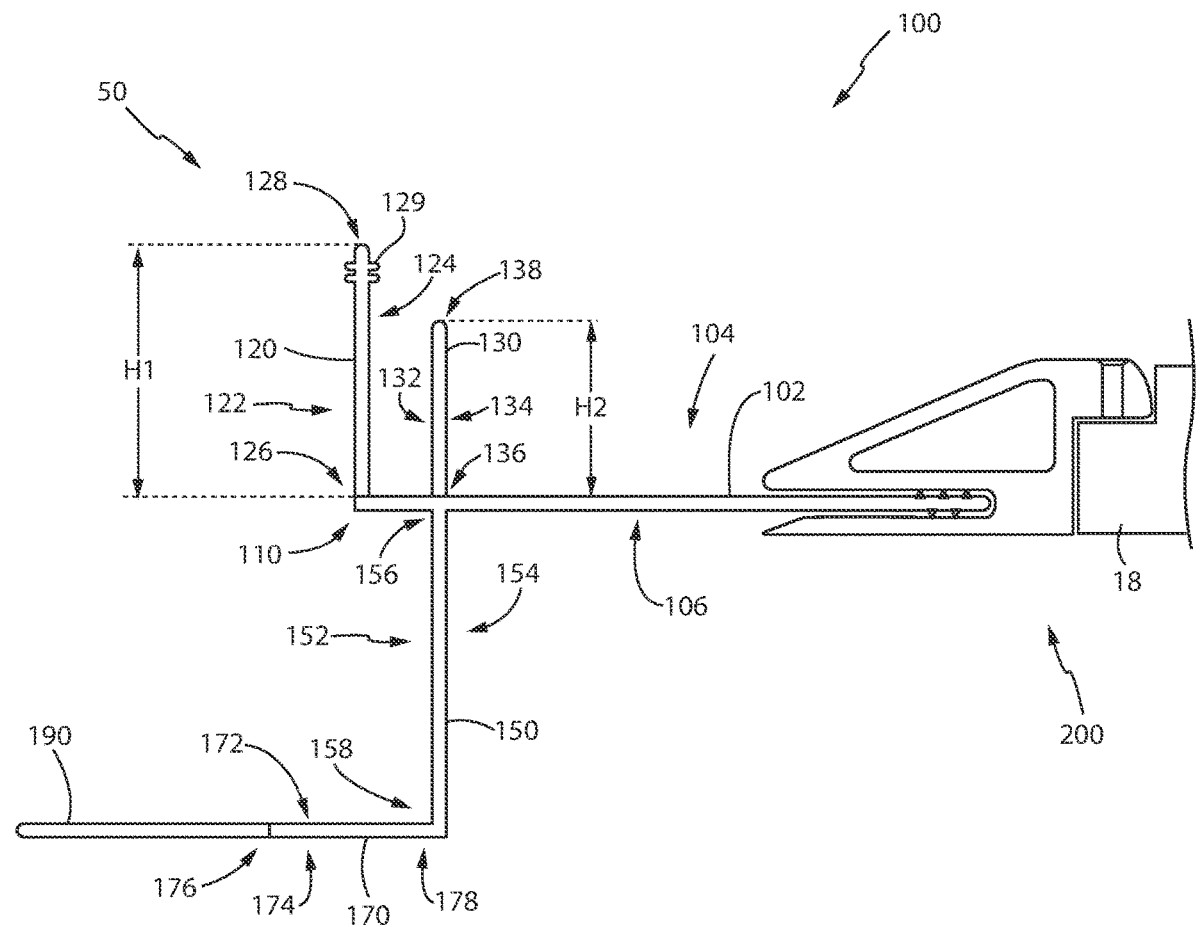
FIG. 3 shows a side elevation view of an embodiment of the invention shown in FIG. 1A.
Figure 4:
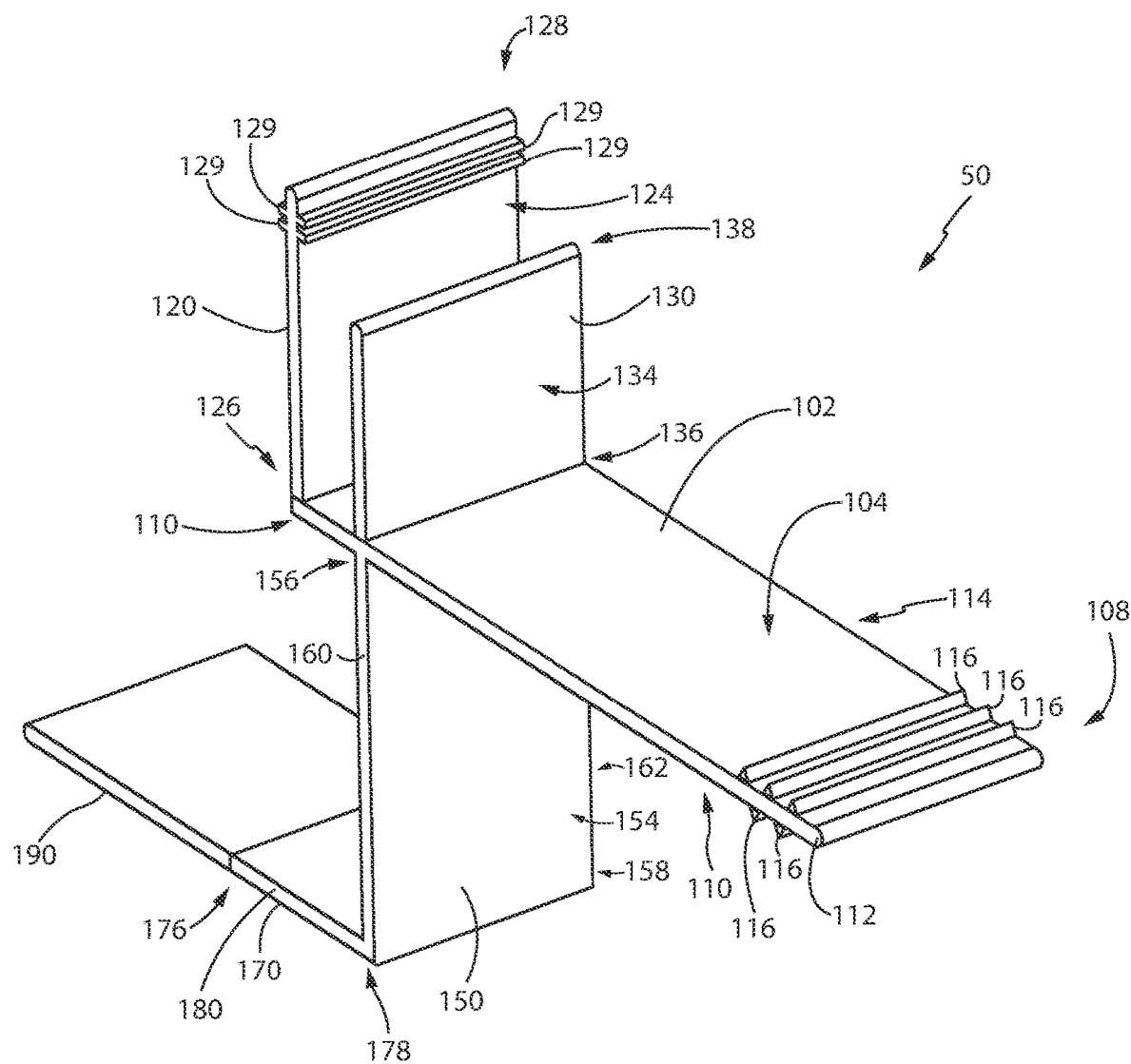
FIG. 4 shows a perspective view of an embodiment of a bottom pan seal.
Figure 5:
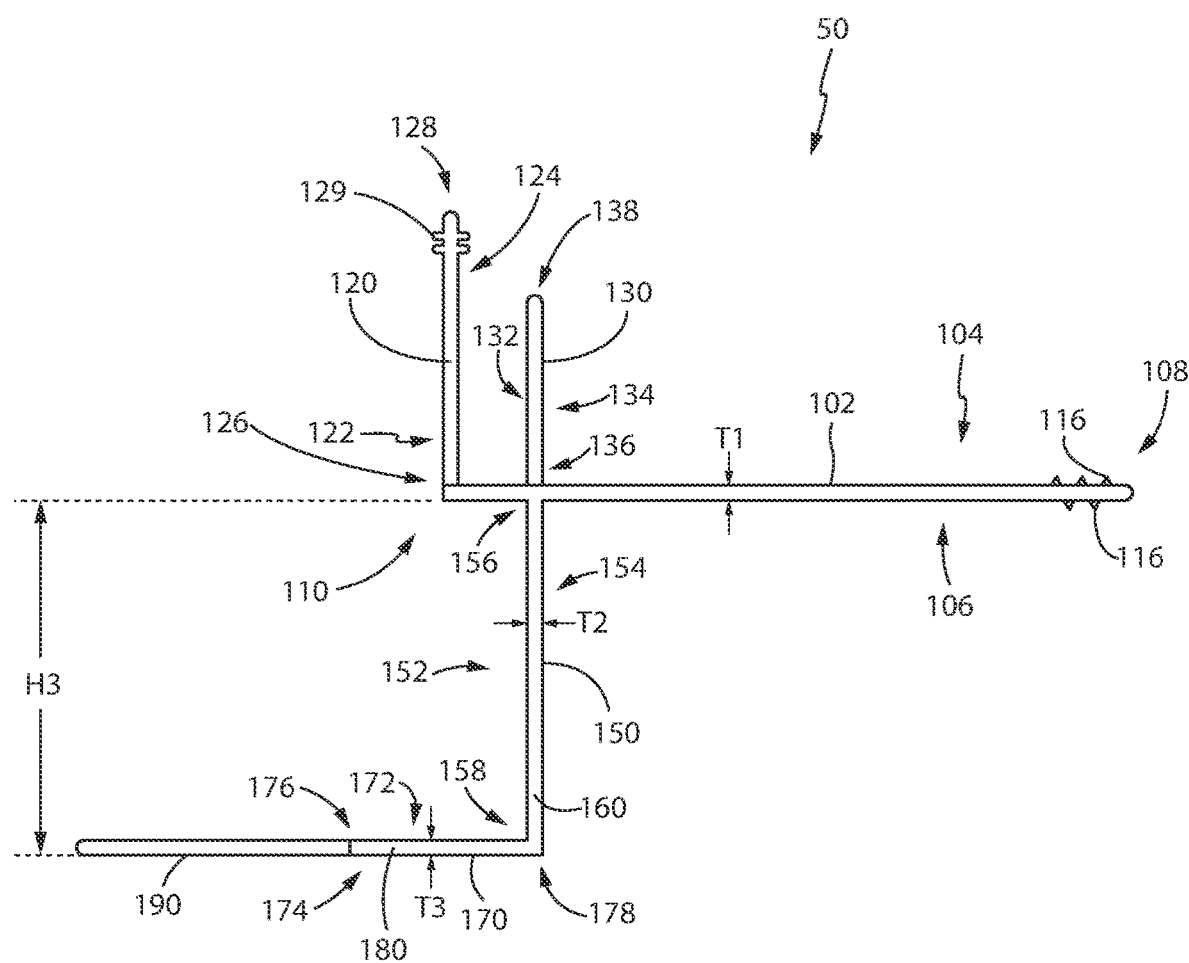
FIG. 5 shows a side elevation view of the bottom pan seal shown in FIG. 4.

As shown in FIGS. 1A and 1B, the invention of the present application is directed towards a bottom pan seal system 50 for use on a recreational vehicle (RV) underneath a floor 12 of a slide-out room 14 to prevent debris, dirt, water, and the like from entering into the RV through the bottom of the RV using a single piece bottom pan seal 100 having a first leg 102, configured to be mounted on the RV parallel to the floor 12 of the slide-out room 14, with a wiper seal 120 projecting perpendicularly therefrom to make contact with the floor 12 of the slide out room, and a second leg 150 operatively connected and generally perpendicular to the first leg 102 opposite the wiper seal 120, with a flap seal 190 operatively connected to the second leg 150 either directly or via a third leg 170, the flap seal 190 projecting generally parallel to the first leg 102 to make contact with a wall 16 of the slide-out room 14 when the slide-out room 14 is contracted into the main cabin of the RV.

With reference to FIGS. 2-5, the first leg 102 is generally flat having a top surface 104, a bottom surface 106 opposite the top surface 104, the top and bottom surfaces 104, 106 bound by an inboard end 108, an outboard end 110 opposite the inboard end 108, a first side 112 adjacent to the inboard end 108 and the outboard end 110, and a second side 114 opposite the first side 112 and adjacent to the inboard end 108 and the outboard end 110.

A first wiper seal 120 having a first height H1 can extend perpendicularly from the top surface 104 of the first leg 102, preferably at the outboard end 110. The wiper seal 120 has an outboard surface 122 and an inboard surface 124 opposite the outboard surface 122, the outboard surface 122 and inboard surface 124 bound by a bottom end 126 operatively connected to the top surface 104 of the first leg 102, and a top end 128 opposite the bottom end 126. The top end 128 of the wiper seal 120 remains free to contact the bottom surface of the floor 12 of the slide-out room 14. To improve the wiping effect of the wiper seal 120, the wiper seal 120 may comprise ribbing 129 adjacent to the top end 128 of the wiper seal 120. The ribbing 126 can be protrusions emanating from the outboard surface 122 and inboard surface 124 of the wiper seal 120. In the preferred embodiment, the wiper seal 120 comprises a plurality of ribbing 129 arranged in parallel sets on the outboard surface 122 and the inboard surface 124.

In the preferred embodiment, a second wiper seal 130 having a height H2 can extend perpendicularly from the top surface 104 of the first leg 102 adjacent to the first wiper seal 120 on the inboard side. The height H2 of the second wiper seal 130 is preferably shorter than the height H1 of the first wiper seal 120; however, they can be the same height as well. The second wiper seal 130 is generally parallel to the first wiper seal 120, and also has an outboard surface 132 and an inboard surface 134 opposite the outboard surface 132, the outboard surface 132 and inboard surface 134 bound by a bottom end 136 operatively connected to the top surface 104 of the first leg 102, and a top end 138 opposite the bottom end 136. The top end 138 of the second wiper seal 130 remains free to contact the bottom surface of the floor 12 of the slide-out room 14. To improve the wiping effect of the second wiper seal 130, the second wiper seal 130 may comprise ribbing adjacent to the top end 138 of the wiper seal 130 similar to that of the first wiper seal 120. The ribbing can be protrusions emanating from the outboard surface 132 and inboard surface 134 of the second wiper seal 130, preferably arranged as parallel sets on the outboard surface 132 and the inboard surface 134. Preferably, the second wiper seal is positioned directly above the second leg 150 and in line with the second leg 150.

The second leg 150 can extend generally perpendicularly from the bottom surface 106 of the first leg 102 adjacent to the outboard end 110 of the first leg 102 in a direction that is away from the first wiper seal 120. The second leg 150 is generally parallel to the first wiper seal 120 and can have an outboard surface 152, an inboard surface 154 opposite the outboard surface 152, the outboard and inboard surfaces 152, 154 bound by a top end 156, a bottom end 158 opposite the top end 156, a first side 160 adjacent to the top end 156 and the bottom end 158, and a second side 162 opposite the first side 160 and adjacent to the top end 156 and the bottom end 158.

Extending perpendicularly from the outboard side 152 of the second leg 150 at the bottom end 158 can be a flap seal 190. The flap seal 190 extends far enough from the second leg 150 so as to extend beyond the first wiper seal 120 on the outboard side. As such, as the slide-out room moves back into the main cabin of the RV 10, the flap seal 190 can make contact with the wall 16 of the slide-out room 14 without the first wiper seal 120 making contact with the wall 16 of the slide-out room 14.

In some embodiments, to further extend the flap seal 190 in the direction of the outboard side, the bottom pan seal 100 may comprise a third leg 170 extending generally perpendicularly to and from the outboard surface 152 of the second leg 150 at the bottom end 158. Therefore, rather than the flap seal 190 extending directly from the outboard surface 152 of the second leg 150, the flap seal 190 can extend from the third leg 170, which extends directly from the outboard surface 152 of the second leg 150. As such, the third leg 170 can have a top surface 172, a bottom surface 174 opposite the top surface 172, the top and bottom surfaces 172, 174 bound by an outboard end 176, an inboard end 178 opposite the outboard end 176, a first side 180 adjacent to the outboard end 176 and the inboard end 178, and a second side opposite the first side 180 and adjacent to the outboard end 176 and the inboard end 178, wherein the inboard end 178 of the third leg 170 is operatively connected to the outboard surface 152 of the second leg 150. The flap seal 190 can extend from the outboard end 176 of the third leg 170, generally parallel and in line with the third leg 170. The third leg 170 gives the flap seal 190 further reach beyond the first wiper seal 120 on the outboard side.

In general, when the slide-out room 14 is slid into the main cabin of the RV, the floor 12 of the slide-out room 14 is above the floor 18 of the main cabin of the RV. In can be desirable when the slide-out room 14 is extended to have the floor 12 of the slide-out room 14 flush, level, or otherwise in line with the floor 18 of the RV 10. In such embodiments, the bottom pan seal system 50 can further comprise a wear bar 200. Preferably, the wear bar 200 has a triangular configuration defined by a base 202, an angled wall 204 above the base 202, and a vertical wall 206 operatively connected to the base 202 and the angled wall 204. A slot 205 is defined in between the base 202 and the angled wall 206 into which the first leg 102 of the bottom pan seal 100 can be inserted.

Figure 6:
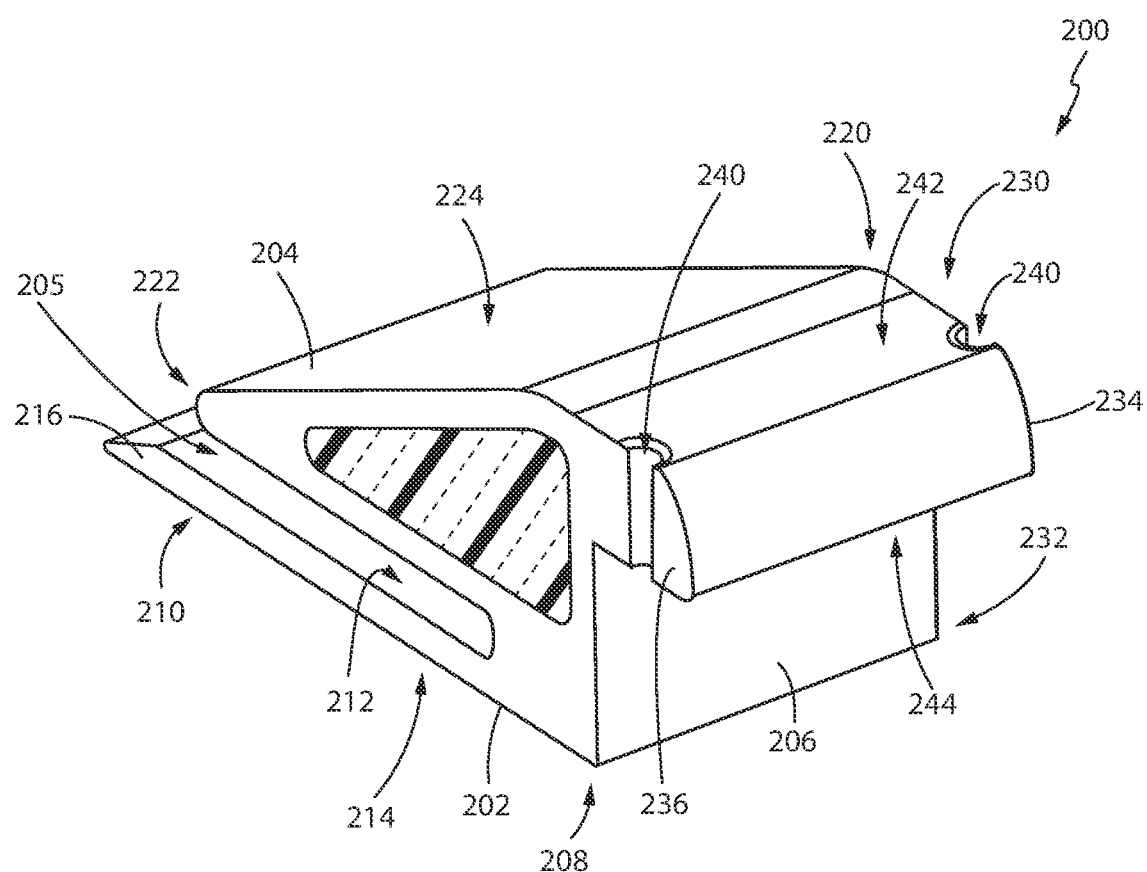
FIG. 6 shows a perspective view of an embodiment of a wear bar.
Figure 7:
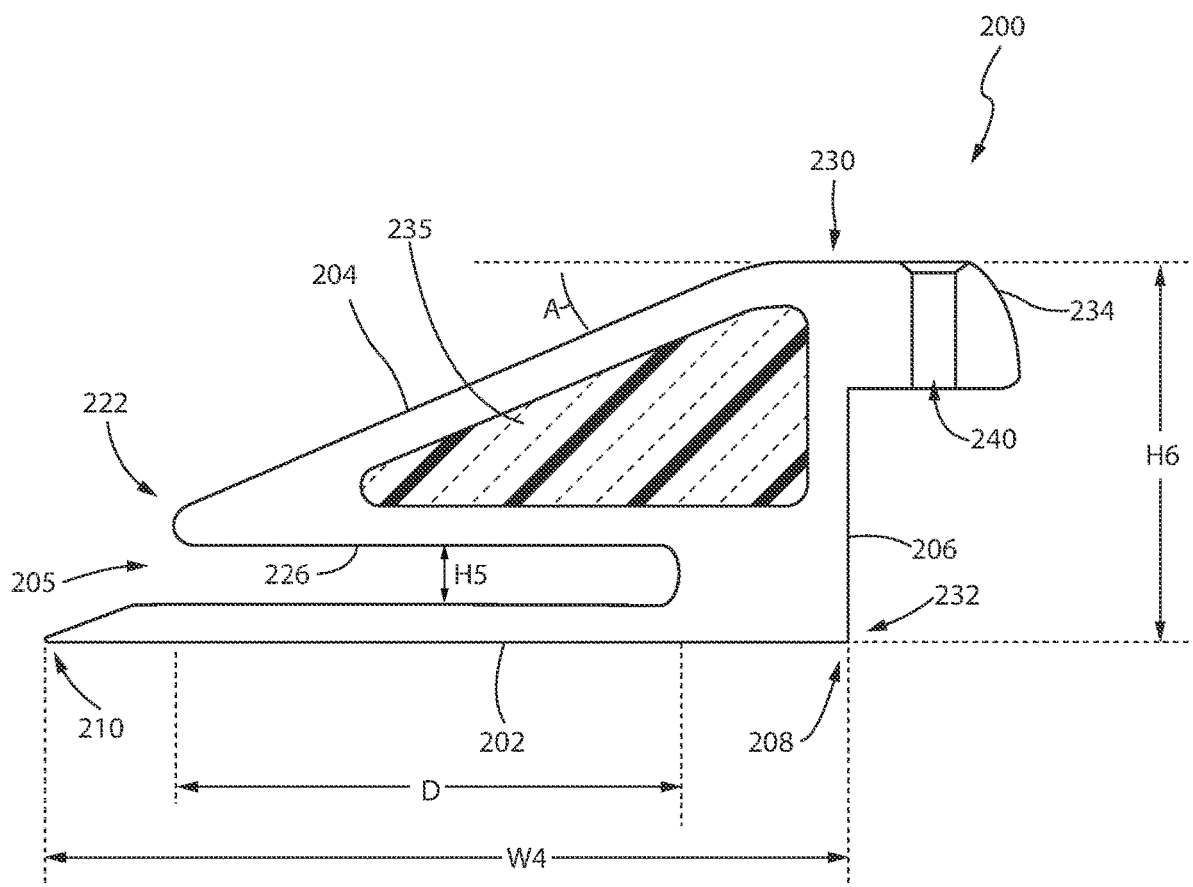
FIG. 7 shows a side elevation view of the wear bar shown in FIG. 6.

With reference to FIGS. 6-7, the base 202 can have a proximal end 208 and a distal end 210 opposite the proximal end 208. Due to the slot 205 in between the angled wall 206 and the base 202, the base 202 has a top surface 212. Opposite the top surface 212 of the base 202 is a bottom surface 214. At the distal end 210 of the base 202, the top surface 212 and the bottom surface 214 are operatively connected by a sidewall 216. Preferably, the sidewall 216 is slanted creating a ramped surface from the bottom surface 214 to the top surface 212 of the base 202.

The angled wall 204 also has a proximal end 220 and a distal end 222 opposite the proximal end 220. The top surface 224 of the angled wall 204 descends from the proximal end 220 of the angled wall 204 to the distal end 222 of the angled wall 204. The angle of descent A depends on the configuration of the floor 12 of the slide-out room 14. The portion of the floor 12 of the slide-out room 14 that remains proximal to the main cabin of the RV 10 when the slide-out room is in its extended position may also have an angled wall 20 that complements the appearance of the angled wall 204 of the wear bar 200. As such, the configuration of the angled wall 204 of the wear bar 200 is in a manner such that when the slide-out room 14 is fully extended, the angled wall of the floor 12 of the slide-out room 14 mates with the angled wall 204 of the wear bar 200 such that the top of the floor 12 of the slide-out room 14 is flush with the top of the floor of the main cabin of the RV 10 as shown in FIG. 1B.

Due to the slot 205, the angled wall 202 further comprises a bottom surface 226. The bottom surface 226 extends from the distal end 222 towards the proximal end, but parallel to the top surface 212 of the base 202. The distance between the bottom surface 226 of the angled wall 204 and the top surface 212 of the base 202 is sufficient to receive the first leg 102 of the bottom pan seal 100. Thus, the slot 205 is a horizontal slot defined in between the angled wall 204 and the base 202, the horizontal slot being parallel to the base 202 and configured to receive the first leg 102.

The base 202 and the angled wall 204 are connected to the vertical wall 206. The vertical wall 206 comprises a top end 230 and a bottom end 232 opposite the top end 230. The proximal end 220 of the angled wall 204 is operatively connected to the top end 230 of the vertical wall 206. The proximal end 208 of the base 202 is operatively connected to the bottom end 232 of the vertical wall 206. Protruding further inboard from the top end 230 of the vertical wall 206 can be a mounting block 234. The mounting block 234 defines a through-hole 240 through which a fastener can be inserted to secure the wear bar 200 to the RV 10. Preferably, the mounting block 234 has two through-holes 240 on opposite sides.

The wear bar 200 is generally triangular in shape. The wear bar 200 can be completely solid or partially hollow. For example, a hollow region can be formed between the surface of the angled wall 204, the bottom surface 226 of the angled wall 204, and the vertical wall 206. The hollow region can be filled with filler material 235 to provide the desired support. For example, the filler material 235 can be thermoplastic material, metal, wood, cork, rubber, and the like.

Figure 8:
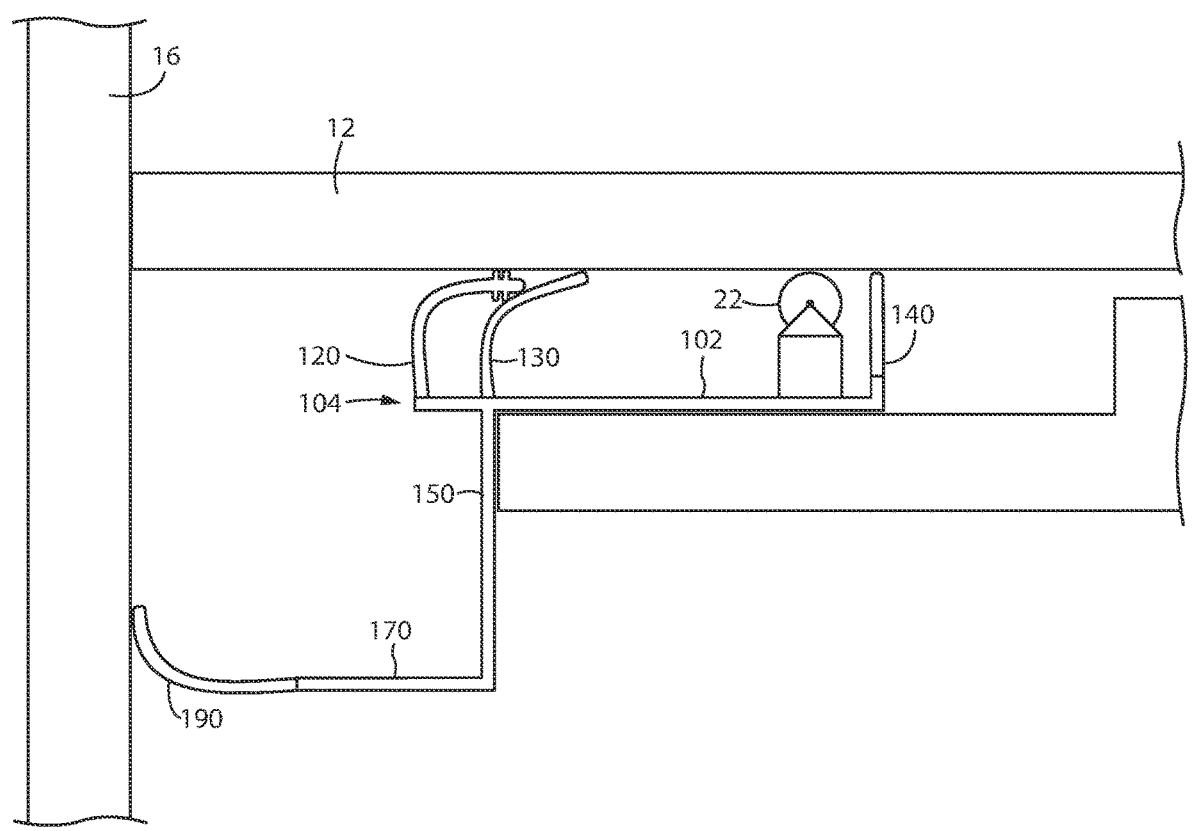
FIG. 8 shows a side elevation view of another embodiment of the present invention installed on an RV in the closed position, with portions of the floor and sidewall of the slide-out room.

In some embodiments, the floor 12 of the slide-out room 14 is not configured to be flush with the floor 18 of the main cabin of the RV from which the slide-out room 14 extends. In such embodiments, the slide-out room 14 can ride on top of a roller 22 as shown in FIG. 8. As such, the roller 22 can be mounted on the first leg 102 of the bottom pan seal 100. In such embodiments, to protect the roller 22 from dirt, dust, water, and the like, the bottom pan seal 100 can further comprise a third wiper seal 140 extending perpendicularly from the top surface 104 of the first leg 102 at the inboard end 108. In some embodiments, the first leg 102 can have a lip 115 extending upwardly from the top surface 104 of the first leg 102 at the inboard end 108. In such embodiments, the third wiper seal 140 extends from and in line with the lip 115 of the first leg.

Figure 9:
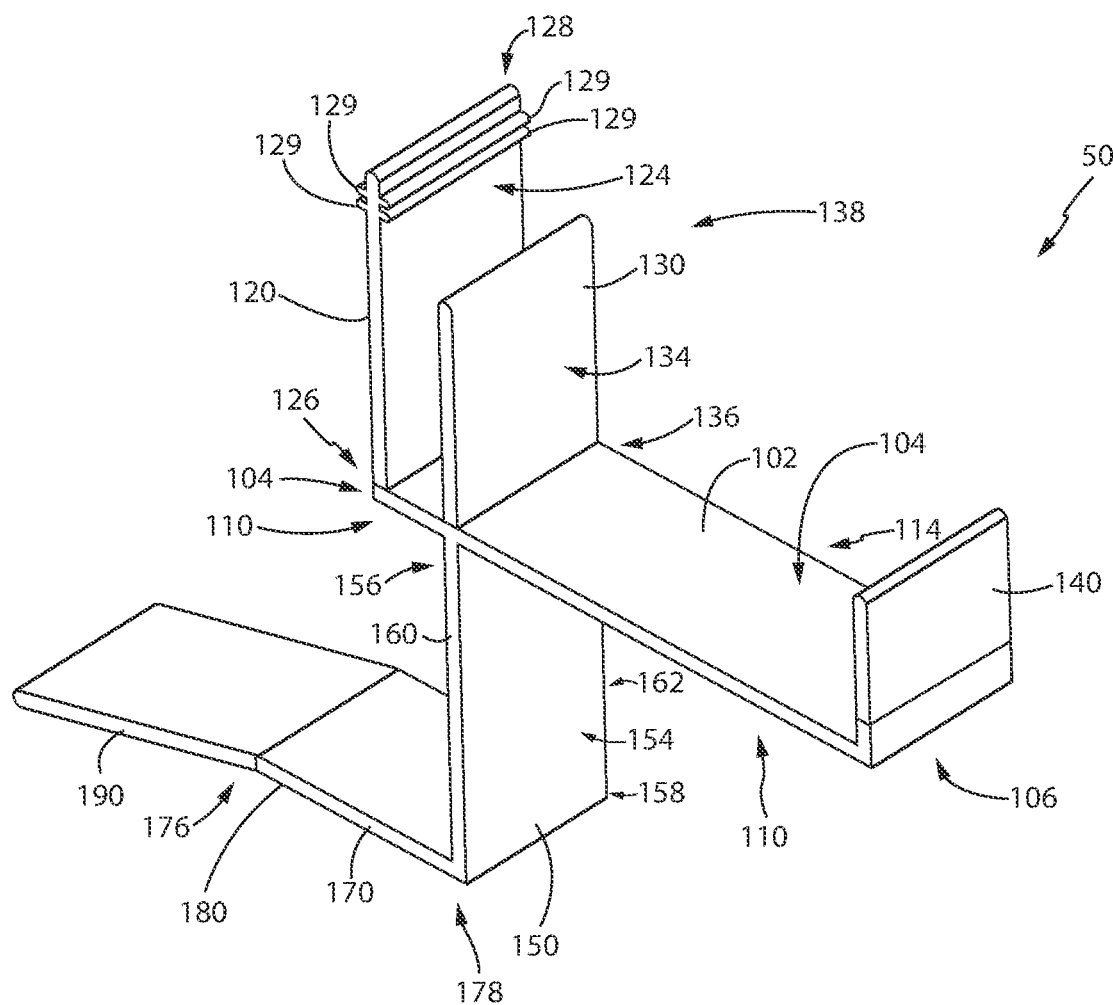
FIG. 9 shows a perspective view of the bottom pan seal shown in FIG. 8.
Figure 10:
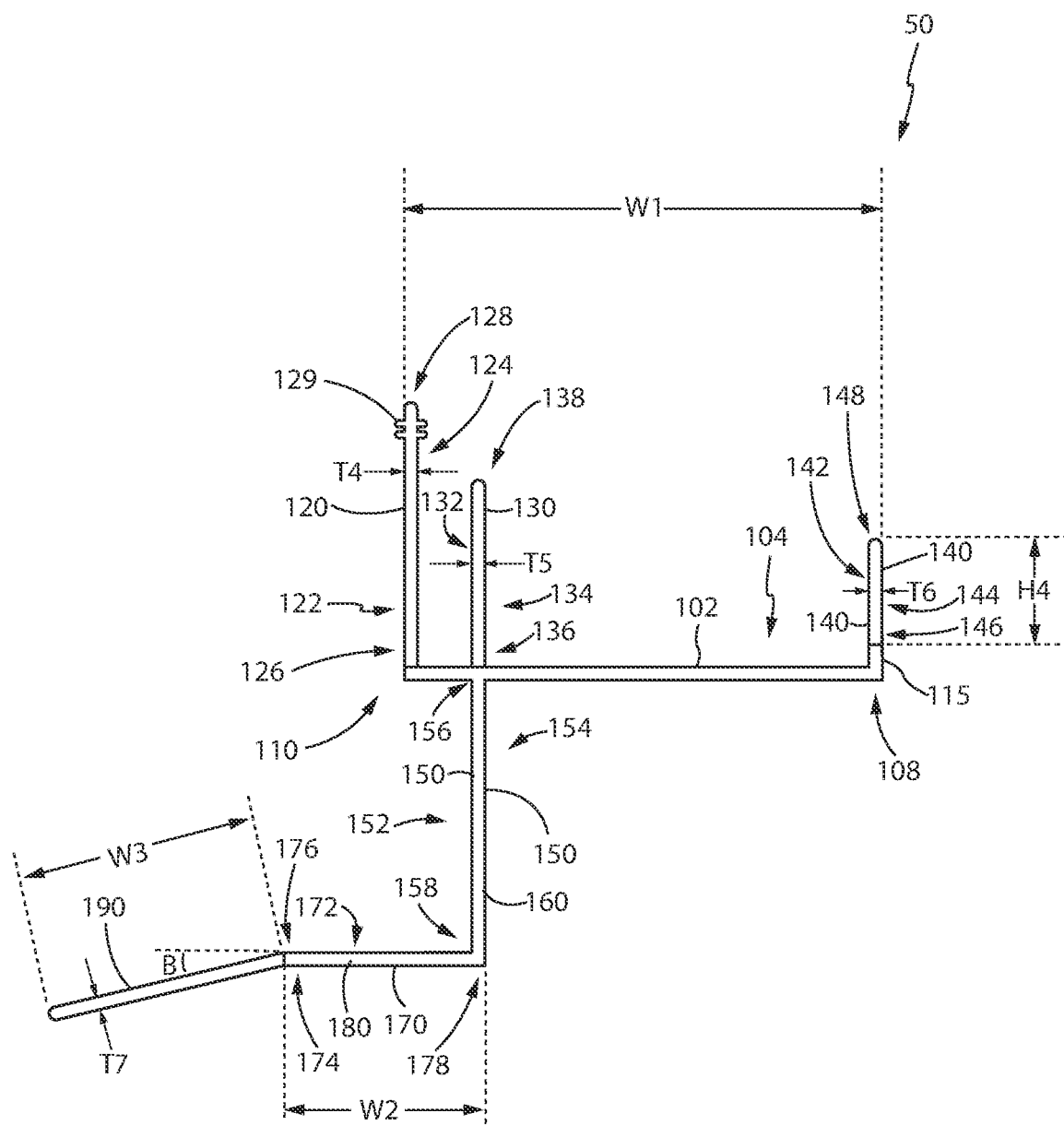
FIG. 10 shows a side elevation view of the bottom pan seal shown in FIG. 8.

With reference to FIGS. 9-10, the third wiper seal 140 has an outboard surface 142, and inboard surface 144 opposite the outboard surface 142, a bottom end 146 adjacent to the outboard surface 142 and the inboard surface 144, and a top end 148 opposite the bottom end 146 and adjacent to the outboard surface 142 and the inboard surface 144.

Figure 11:
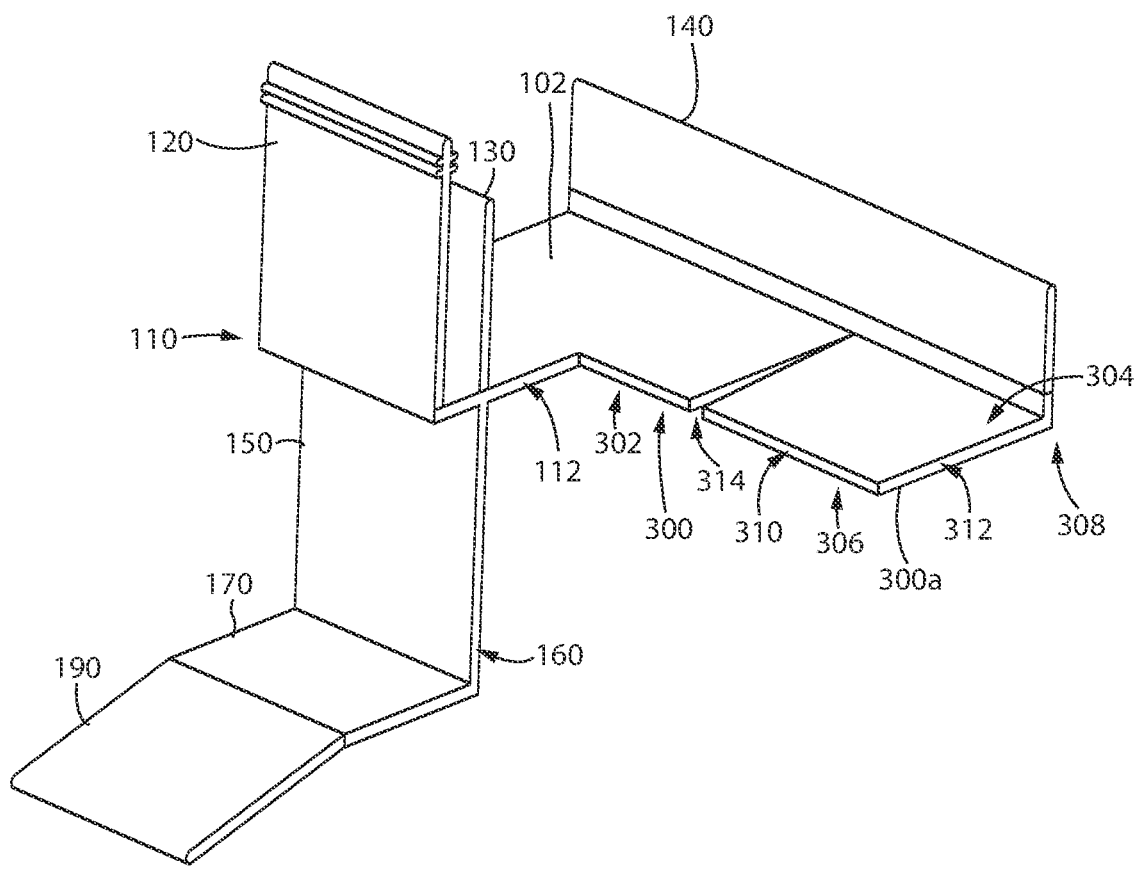
FIG. 11 shows a perspective view of another embodiment of the bottom pan seal.

In some embodiments, the third wiper seal 140 serves another function in that it can create a water management system to facilitate removal of any water. For example, with reference to FIGS. 11-12, the first side 112 of the first leg 102 can have an extension 300 that extends beyond the first side 112 of the first leg 102 and the first side 160 of the second leg 150. The extension 300 has a top surface 304, a bottom surface 306 opposite the top surface 304, an inboard end 308 adjacent to the top surface 304 and the bottom surface 306, and an outboard end 310 opposite the inboard end 308 and adjacent to the top surface 304 and the bottom surface 306. The extension 300 extends from the first side 112 of the first leg 102 and terminates at a free end 312. The third wiper seal 140 extends continuously to the extension 300 along the inboard end 308 of the extension 300 to the free end 312. The extension 300 can have a slit 314 in between the first side 112 of the first leg 102 and the free end 312 of the extension 300, thereby defining a free end portion 300a of the extension 300 and a fixed end portion 300b of the extension 300 that is operatively connected to the first side 112 of the first leg 102. The slit 314 extends from the outboard end 310 to the inboard end 308 of the extension 300.

Figure 12:
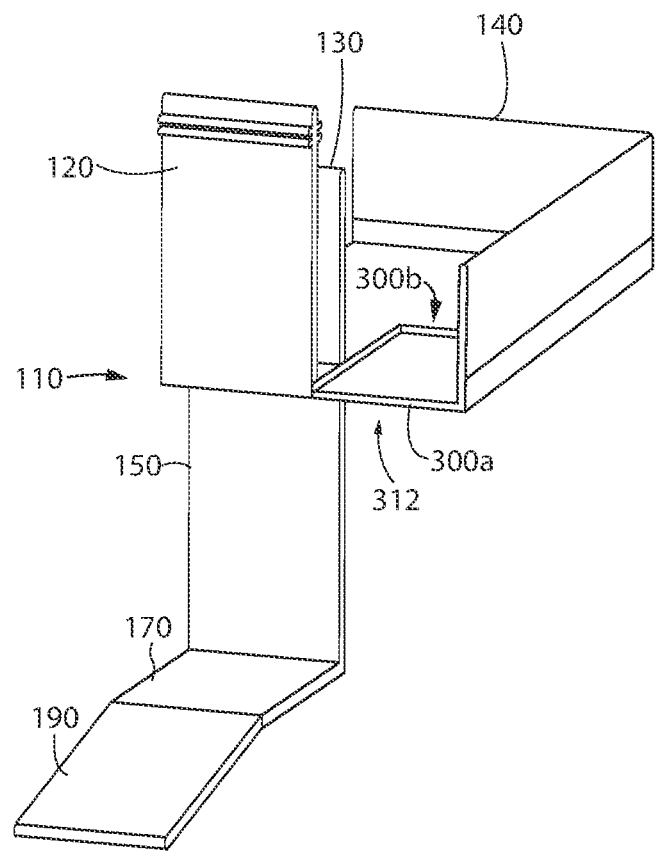
FIG. 12 shows a perspective view of the bottom pan seal shown in FIG. 11 in a different configuration.

The outboard end 310 of the extension 300 can be recessed in the inboard direction relative to the outboard end 110 of the first leg 102, thereby creating a notch. The distance from the first side 112 of the first leg 102 to the slit 314 is approximately the same as the distance from the inboard end 308 of the extension 300 to the outboard end 310 of the extension 300. The slit 314 allows the free end portion 300a of the extension 300 to bend at approximately 90 degrees relative to the fixed end portion 300b of the extension 300 that is operatively connected to the first leg 102. As such, the top surface 304 of the free end portion 300a can slide underneath the bottom surface 306 of the fixed end portion 300b thereby creating a corner as shown in FIG. 12. This corner allows any water inside the channel defined by the second wiper seal 130 and the third wiper seal 140 to flow to the corner and out the free end 312.

The bottom pan seal system 50 can be manufactured using plastic extrusion techniques, including multi-extrusion techniques, such as co-extrusion or tri-extrusion. Using multi-extrusion techniques allows the different components, such as the legs 102, 150, 170, the seals 120, 130, 140, 190, ribs 116, 129, and other components can be made with different material, hardness, or flexibility as desired. The material for the various components may be EPDM rubber. They can also be manufactured with plastic using TPV, TPO and TPE, or any combination thereof.

For example, the wiper seals 120, 130, 140, flap seal 190, and ribs 116, 129 can be made from TPE having a hardness ranging from about 25 Shore A to about 45 Shore A. Preferably, the hardness of these seals and ribs range from about 30 Shore A to about 40 Shore A. More preferably, the hardness of these seals and ribs can be about 35 Shore A.

The first leg 102, second leg 150, and third leg 170 can be made from TPO having a hardness ranging from about 40 Shore D to about 60 Shore D. Preferably, the hardness of these legs can range from about 45 Shore D to about 55 Shore D. More preferably, the hardness of these legs are about 50 Shore D.

By way of example only, the width W1 of the first leg 102 as measured from the outboard end 110 to the inboard end 108 can range from about 2 inches to about 6 inches. Preferably, the width W1 of the first leg 102 ranges from about 3 inches to about 5 inches. More preferably, the width W1 of the first leg 102 ranges from about 3.4 inches to about 4.1 inches.

The second leg 150 can be positioned approximately 0.3 inches to approximately 1 inch from the outboard end 110 of the first leg 102. Preferably, the second leg 150 can be positioned approximately 0.40 inch to approximately 0.75 inch from the outboard end 110 of the first leg 102. More preferably, the second leg 150 can be positioned approximately 0.475 inch to approximately 0.500 inch from the outboard end 110 of the first leg 102. The height H3 of the second leg 150 as measured from the top end 156 to the bottom end 158 can range from about 1 inch to about 3 inches. Preferably, the height H3 of the second leg 150 can range from about 1.5 inch to about 2.5 inch. More preferably, the height H3 can range from about 1.98 inch to about 2.125 inch.

In embodiments with the third leg 170, the width W2 of the third leg 170 as measured from the outboard end 176 to the inboard end 176 can range from approximately 0.475 inch to about 2 inches. Preferably, the width W2 of the third leg 170 can range from about 0.75 inch to about 1.5 inch. More preferably, the width W2 of the third leg 170 can range from about 1.125 inch to about 1.4 inch.

The thicknesses T1, T2, T3 of each leg 102, 150, 170 can range from about 0.03 inch to about 0.125 inch. Preferably, the thicknesses T1, T2, T3 of each leg 102, 150, 170 can range from about 0.05 inch to about 0.10 inch. More preferably, the thicknesses T1, T2, T3 of each leg 102, 150, 170 can range from about 0.075 inch to about 0.08 inch.

The first wiper seal 120 can have a height H1 ranging from about 1.25 inch to about 2.5 inches. Preferably, the height H1 of the first wiper seal 120 can range from about 1.5 inch to about 2.25 inch. More preferably, the height H1 of the first wiper seal 120 can range from about 1.625 inch to about 1.927 inch.

The second wiper seal 130 can have a height H2 ranging from about 0.75 inch to about 1.75 inch. Preferably, the height H2 of the second wiper seal 130 can range from about 1.0 inch to about 1.5 inch. More preferably, the height H2 of the second wiper seal 130 can range from about 1.125 inch to about 1.380 inch.

The third wiper seal 140 can have a height H4 ranging from about 0.25 inch to about 1.25 inch. Preferably, the height H4 of the third wiper seal 140 can range from about 0.5 inch to about 1.00 inch. More preferably, the height H4 of the third wiper seal 140 can range from about 0.75 inch to about 0.85 inch.

The flap seal 190 can have a width W3 of about 1.0 inch to about 2.5 inches. Preferably, the width W3 of the flap seal 190 can range from about 1.4 inch to about 2.25 inches. More preferably, the width W3 of the flap seal 190 can range from about 1.625 inch to about 2.00 inches. In some embodiments, the flap seal 190 is angled downwardly relative to the third leg 170. The angle of descent B of the flap seal 190 relative to the third leg 170 can range from about 0 degrees to about 30 degrees. Preferably, the angle of descent B ranges from about 10 degrees to about 25 degrees. More preferably, the angle of descent B ranges from about 13 degrees to about 20 degrees.

The thicknesses T4, T5, T6, T7 of the first wiper seal 120, second wiper seal 130, third wiper seal 140, and flap seal 190, respectively can have the same range of thickness as the first, second, and third legs 102, 150, 170.

Each rib 116, 129 can project away from their respective surfaces by about 0.03 inch to about 0.1 inch. Preferably, each rib 116, 129 projects away from their respective surface by about 0.05 inch to about 0.085 inch. More preferably, each rib 116, 129 projects away from their respective surface by about 0.06 inch to about 0.075.

The height H5 of the slot 205 of the wear bar 200 as measured from the top surface 212 of the base 202 to the bottom surface 224 of the angled wall 204 can range from about 0.07 inch to about 0.3 inch. Preferably, the height H5 of the slot 205 can range from about 0.1 inch to about 0.25 inch. More preferably, the height H5 of the slot 205 can range from about 0.15 inch to about 0.2 inch. For example, the height H5 of the slot 205 can be about 0.175 inch. The depth D of the slot 205 can be dependent on the width W1 of the first leg 102. The depth D of the slot 205 can range from about 0.75 inch to about 2.5 inches. Preferably, the depth D of the slot 205 ranges from about 1.0 inch to about 2.0 inches. More preferably, the depth D of the slot 205 can range from about 1.25 inch to about 1.75 inch. For example, the depth D of the slot 205 can be about 1.5 inch.

The base 202 can have a width W4 as measured from the proximal end 208 to the distal end 210 of about 1 inch to about 3 inches. Preferably, the width W4 of the base 202 is about 1.5 inch to about 2.5 inches. More preferably, the width W4 of the base 202 is about 1.75 inch to about 2.25 inch. For example, the width W4 can be about 2 inches. In some embodiments, the width W4 is 2.5 inches. As shown in FIGS. 6 and 7, in the preferred embodiment, the distal end 210 of the base 202 extends beyond the distal end 222 of the angled wall 204 in the outboard end direction. In some embodiments, the top surface 212 of the base 202 extends beyond the distal end 222 of the angled wall towards the outboard end. The height H6 of the vertical wall 206 as measured from the top end 230 of the vertical wall 206 to the bottom end 232 of the vertical wall 206 can range from about 0.5 inch to about 2 inches. Preferably, the height H6 of the base 202 can range from about 0.75 inch to about 1.5 inch. More preferably, the height H6 of the base 202 can range from about 1 inch to about 1.25 inch. For example, the height H6 of the base can be about 1.125 inch.

The angle of descent A of the angled wall 204 can range from about 10 degrees to about 45 degrees. Preferably, the angle of descent A ranges from about 15 degrees to about 30 degrees. More preferably, the angle of descent ranges from about 20 degrees to about 25 degrees.

The length L1 of the bottom pan seal 100 and the length L2 of the wear bar 200 as measured from one side to the opposite side varies and can be cut to match the opening for the slide-out room 14. As such, the length of the bottom pan seal system 50 shown in the drawings have been truncated for ease of viewing the features of the bottom pan seal system 50 and is not limiting in terms of its proportion to the width or height.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention not be limited by this detailed description, but by the claims and the equivalents to the claims appended hereto.

What is claimed is:

1. A bottom pan seal system for use underneath a floor of a slide-out room of a recreational vehicle, the bottom pan seal system comprising a bottom pan seal comprising:

a) a first leg having a top surface, a bottom surface opposite the top surface, the top and bottom surfaces bound by an inboard end, an outboard end opposite the inboard end, a first side adjacent to the inboard end and the outboard end, and a second side opposite the first side and adjacent to the inboard end and the outboard end;

b) a second leg extending generally perpendicularly from the bottom surface of the first leg adjacent to the outboard end, the second leg having an inboard surface, an outboard surface opposite the inboard surface, the inboard and outboard surfaces bound by a top end, a bottom end opposite the top end, a first side adjacent to the top end and the bottom end, and a second side opposite the first side and adjacent to the top end and the bottom end;

c) a third leg extending generally perpendicularly from the outboard surface of the second leg at the bottom end, the third leg having a top surface, a bottom surface opposite the top surface, the top and bottom surfaces bound by an inboard end, an outboard end opposite the inboard end, a first side adjacent to the inboard end and the outboard end, and a second side opposite the first side and adjacent to the inboard end and the outboard end, wherein the inboard end of the third leg is operatively connected to the outboard surface of the second leg;

d) a first wiper seal having a height extending perpendicularly from the top surface of the first leg at the outboard end;

e) a second wiper seal having a height extending perpendicularly from the top surface of the first leg directly above the top end of the second leg and in line with the second leg, wherein the height of the second wiper is shorter than the height of the first wiper; and f) a flap seal extending from the outboard end of the third leg.

2. The bottom pan seal system of claim 1, further comprising a wear bar having a triangular configuration defined by a base having a proximal end and a distal end opposite the proximal end, a vertical wall having a bottom end and a top end opposite the bottom end, the bottom end of the vertical wall operatively connected to the proximal end of the base, an angled wall having a proximal end and a distal end opposite the proximal end of the angled wall, the proximal end of the angled wall operatively connected to the top end of the vertical wall, the angled wall descending from the top end of the vertical wall to the distal end of the base, and a horizontal slot defined in between the angled wall and the base, the horizontal slot parallel to the base and configured to receive the first leg, wherein the distal end of the base extends beyond the distal end of the angled wall towards the outboard end.

3. The bottom pan seal system of claim 1, further comprising a third wiper seal extending perpendicularly from the top surface of the inboard end of the first leg.

4. The bottom pan seal system of claim 3, further comprising an extension extending from the first side of the first leg, the extension comprising a free end opposite the first side of the first leg, wherein the extension comprises a slit in between the first side of the first leg and the free end.

5. A bottom pan seal system for use underneath a floor of a slide-out room of a recreational vehicle, the bottom pan seal comprising:

a) a first leg having a top surface, a bottom surface opposite the top surface, the top and bottom surfaces bound by an inboard end, an outboard end opposite the inboard end, a first side adjacent to the inboard end and the outboard end, and a second side opposite the first side and adjacent to the inboard end and the outboard end;

b) a second leg extending generally perpendicularly from the bottom surface of the first leg adjacent to the outboard end, the second leg having an inboard surface, an outboard surface opposite the inboard surface, the inboard and outboard surfaces bound by a top end, a bottom end opposite the top end, a first side adjacent to the top end and the bottom end, and a second side opposite the first side and adjacent to the top end and the bottom end;

c) a first wiper seal having a height extending perpendicularly from the top surface of the first leg at the outboard end; and d) a flap seal extending from the outboard end of the third leg.

6. The system of claim 5, further comprising a second wiper seal having a height extending perpendicularly from the top surface of the first leg.

7. The system of claim 6, further comprising a third leg extending generally perpendicularly from the outboard surface of the second leg at the bottom end of the second leg, the third leg having a top surface, a bottom surface opposite the top surface, the top and bottom surfaces bound by an inboard end, an outboard end opposite the inboard end, a first side adjacent to the inboard end and the outboard end, and a second side opposite the first side and adjacent to the inboard end and the outboard end.

8. The system of claim 7, wherein the flap seal extends from the third leg.

9. The system of claim 8, wherein the second wiper is in line with the second leg.

10. The system of claim 9, wherein the height of the second wiper is smaller than the height of the first wiper.

11. The system of claim 10, further comprising third wiper seal extending perpendicularly from the top surface at the inboard end of the first leg.

12. The system of claim 11, further comprising an extension extending from the first side of the first leg, the extension comprising a free end opposite the first side of the first leg, wherein the extension comprises a slit in between the first side of the first leg and the free end.

13. The system of claim 10, further comprising a wear bar having a triangular configuration defined by a base having a proximal end and a distal end opposite the proximal end, a vertical wall having a bottom end and a top end opposite the bottom end, the bottom end of the vertical wall operatively connected to the proximal end of the base, an angled wall having a proximal end and a distal end opposite the proximal end of the angled wall, the proximal end of the angled wall operatively connected to the top end of the vertical wall, the angled wall descending from the top end of the vertical wall to the distal end of the base, and a horizontal slot defined in between the angled wall and the base, the horizontal slot parallel to the base and configured to receive the first leg.

14. The system of claim 5, further comprising a second wiper seal having a height extending perpendicularly from the top surface of the first leg, wherein the height of the second wiper is smaller than the height of the first wiper.

15. The system of claim 5, further comprising a second wiper seal extending perpendicularly from the top surface of the first leg, wherein the second wiper is in line with the second leg.

16. The system of claim 5, further comprising a wear bar having a triangular configuration defined by a base having a proximal end and a distal end opposite the proximal end, a vertical wall having a bottom end and a top end opposite the bottom end, the bottom end of the vertical wall operatively connected to the proximal end of the base, an angled wall having a proximal end and a distal end opposite the proximal end of the angled wall, the proximal end of the angled wall operatively connected to the top end of the vertical wall, the angled wall descending from the top end of the vertical wall to the distal end of the base, and a horizontal slot defined in between the angled wall and the base, the horizontal slot parallel to the base and configured to receive the first leg.

17. The system of claim 16, wherein the first leg comprises a rib projecting from the inboard end of the first leg.

18. The system of claim 5, further comprising a second wiper seal extending perpendicularly from the top surface at the inboard end of the first leg.

19. The system of claim 18, further comprising an extension extending from the first side of the first leg, the extension comprising a free end opposite the first side of the first leg, wherein the extension comprises a slit in between the first side of the first leg and the free end.

20. The system of claim 5, further comprising a third leg extending generally perpendicularly from the outboard surface of the second leg at the bottom end, the third leg having a top surface, a bottom surface opposite the top surface, the top and bottom surfaces bound by an inboard end, an outboard end opposite the inboard end, a first side adjacent to the inboard end and the outboard end, and a second side opposite the first side and adjacent to the inboard end and the outboard end, wherein the flap seal extends from the third leg.

\* \* \* \* \*